United States Patent
Du et al.

(10) Patent No.: US 8,500,587 B2
(45) Date of Patent: Aug. 6, 2013

(54) MULTIPLE-VARIATOR CONTROL FOR SPLIT POWER CVT AND HYDROSTATIC TRANSMISSIONS

(75) Inventors: Hongliu Du, Naperville, IL (US); Tony L. Marcott, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 240 days.

(21) Appl. No.: 12/973,572

(22) Filed: Dec. 20, 2010

(65) Prior Publication Data

US 2012/0152056 A1   Jun. 21, 2012

(51) Int. Cl.
 *F16H 47/04* (2006.01)
(52) U.S. Cl.
 USPC .................................. 475/73; 475/83
(58) Field of Classification Search
 USPC .................... 475/32, 72, 73, 75, 83
 See application file for complete search history.

(56) References Cited

U.S. PATENT DOCUMENTS

| | | | |
|---|---|---|---|
| 3,455,184 A | 7/1969 | Frandsen et al. | |
| 3,529,492 A * | 9/1970 | Tuck | 475/24 |
| 3,908,374 A * | 9/1975 | Habiger | 60/420 |
| 4,096,694 A * | 6/1978 | Habiger et al. | 60/459 |
| 4,848,186 A | 7/1989 | Dorgan et al. | |
| 5,518,461 A | 5/1996 | Pfordt | |
| 7,121,970 B2 | 10/2006 | Funato et al. | |
| 7,967,099 B2 * | 6/2011 | Fausch | 180/308 |
| 2006/0191732 A1 * | 8/2006 | Lunzman et al. | 180/307 |
| 2008/0128189 A1 * | 6/2008 | Pruitt et al. | 180/197 |
| 2009/0139224 A1 | 6/2009 | Ishizaki et al. | |

FOREIGN PATENT DOCUMENTS

| | | |
|---|---|---|
| DE | 3733152 A1 | 4/1989 |
| JP | 60203584 | 10/1985 |
| JP | 02261952 | 10/1990 |
| JP | 2002067720 | 3/2002 |

* cited by examiner

*Primary Examiner* — Justin Holmes
(74) *Attorney, Agent, or Firm* — Leydig, Voit & Mayer

(57) ABSTRACT

A system for providing hydraulic power in a machine transmission includes a first hydraulic variator and a second hydraulic variator, each variator having a mechanical input to a hydraulic pump, and a hydraulic motor linked to the hydraulic pump via a hydraulic circuit, and a mechanical output from the hydraulic motor. In an embodiment, the first hydraulic circuit side of one variator is hydraulically connected to the first hydraulic side of the other variator, and the second hydraulic circuit sides are likewise linked together. A common input is geared to the inputs of the variators and a common output is geared to the outputs of the variators, tying the pump and motor of each variator to rotate at the same speed as the counterpart components of the other variator.

20 Claims, 7 Drawing Sheets

MULTIPLE-VARIATOR CONTROL FOR SPLIT POWER CVT AND HYDROSTATIC TRANSMISSIONS

TECHNICAL FIELD

This patent disclosure relates generally to hydraulic transmissions, and more particularly to a system for allowing the use and control of multiple variators in split power CVT and hydrostatic transmissions.

BACKGROUND

Split power continuously variable transmissions (CVTs) and hydrostatic transmissions (hystats) have certain advantages over more conventional transmission types used on earth moving and agriculture machines. In the split power CVT machine, in addition to an engine directly driving a mechanical transmission system, a hydraulic motor, typically of fixed displacement and variable hydraulic pump, is used as a variator to provide continuously variable torque and speed to the drive train. In a Hydrostatic machine, or "hydrostat," the hydraulic motor is used directly without the additional mechanical drive from the engine.

In either case, with the continuously variable speed of the transmission provided in these arrangements, higher transmission efficiency can be obtained relative to a torque converter transmission. In addition, the engine can be regulated close to its optimum operating point (e.g., peak torque, and/or peak rpm, and/or minimum emissions per power unit) so that better performance can be expected for machines equipped with hydrostatic or parallel path type transmissions as described above. In a machine equipped with such a transmission, the machine speed or drawbar power can be controlled by controlling the hydraulic motor (e.g., controlling swash plate position of hydraulic pump, and/or controlling hydraulic motor output torque). In short, split power CVT machines and hydrostatic drive machines typically function in a stable and beneficial manner relative to other drive types.

However, such transmissions have certain inherent limitations, most notably with respect to the size of the hydraulic pumps and motors. In particular, it has been difficult to date to scale up either system type to account for much larger machine sizes. For example, larger displacement hydraulic pumps and motors inherently possess much more limited operating speed capabilities than smaller pumps and motors. Moreover, large-sized piston hydraulic displacement machines tend to be less efficient than their smaller counterparts. In addition, larger-sized actuators will be required for controlling larger pumps and motors, thus requiring larger control valves to handle the higher control flow requirements, which further complicates the system design.

While the disclosed principles herein are directed at least in part to overcoming one or more disadvantages, noted or otherwise, it will be appreciated that the innovations herein are defined by the attached claims without to regard to whether and to what extent the specifically claimed embodiments overcome one or more of the noted problems in the existing technology. Moreover, it will be appreciated that any discussion herein of any reference or publication is merely intended as an invitation to study the indicated reference itself, and is not intended to replace or supplement the actual reference. To the extent that the discussion of any reference herein is inconsistent with that reference, it will be appreciated that the reference itself is conclusive as to its teachings.

SUMMARY

In one aspect, a system is disclosed for providing hydraulic power in a machine transmission, including a first hydraulic variator having an input, a hydraulic pump linked to the input, a hydraulic motor linked to the hydraulic pump via a hydraulic circuit having a first side and a second side, and an output from the hydraulic motor. A second hydraulic variator is included, having an input, a hydraulic pump linked to the input, a hydraulic motor linked to the hydraulic pump via a hydraulic circuit having a first side and a second side, and an output from the hydraulic motor. The first side of the hydraulic circuit of the second hydraulic variator is hydraulically connected to the first side of the hydraulic circuit of the first hydraulic variator, and the second side of the hydraulic circuit of the second hydraulic variator is hydraulically connected to the second side of the hydraulic circuit of the first hydraulic variator. A common input is geared to the input of the first hydraulic variator and the input of the second hydraulic variator, such that the inputs of the first and second hydraulic variators rotate at the same speed. Moreover, a common output is geared to the output of the first hydraulic variator and the output of the second hydraulic variator, such that the outputs of the first and second hydraulic variators rotate at the same speed.

In another aspect, a hydraulic machine transmission is disclosed having two or more variators linked in parallel mechanically such that their inputs are forced to rotate together and their outputs are forced to rotate together. Each of the two or more variators has a hydraulic circuit with first and second sides and a bridging hydraulic link between the first sides of the hydraulic circuits of all of the two or more variators. The hydraulic machine transmission also includes a bridging hydraulic link between the second sides of the hydraulic circuits of all of the two or more variators.

In yet a further aspect, a method is disclosed for providing stability in a variator system having multiple variators mechanically connected in parallel, each having a hydraulic circuit with first and second sides. The method includes hydraulically connecting the first circuit sides of each variator to a first common bridge, and hydraulically connecting the second circuit sides of each variator to a second common bridge, whereby the pressure differential between the first and second sides in each variator is substantially the same for all variators.

It is to be understood that both the foregoing general description and the following detailed description are exemplary and explanatory only and are not restrictive of the invention. Further aspects and features of the disclosed principles will be appreciated from the following detailed description and the accompanying drawings, of which:

DETAILED DESCRIPTION

Figure 1:
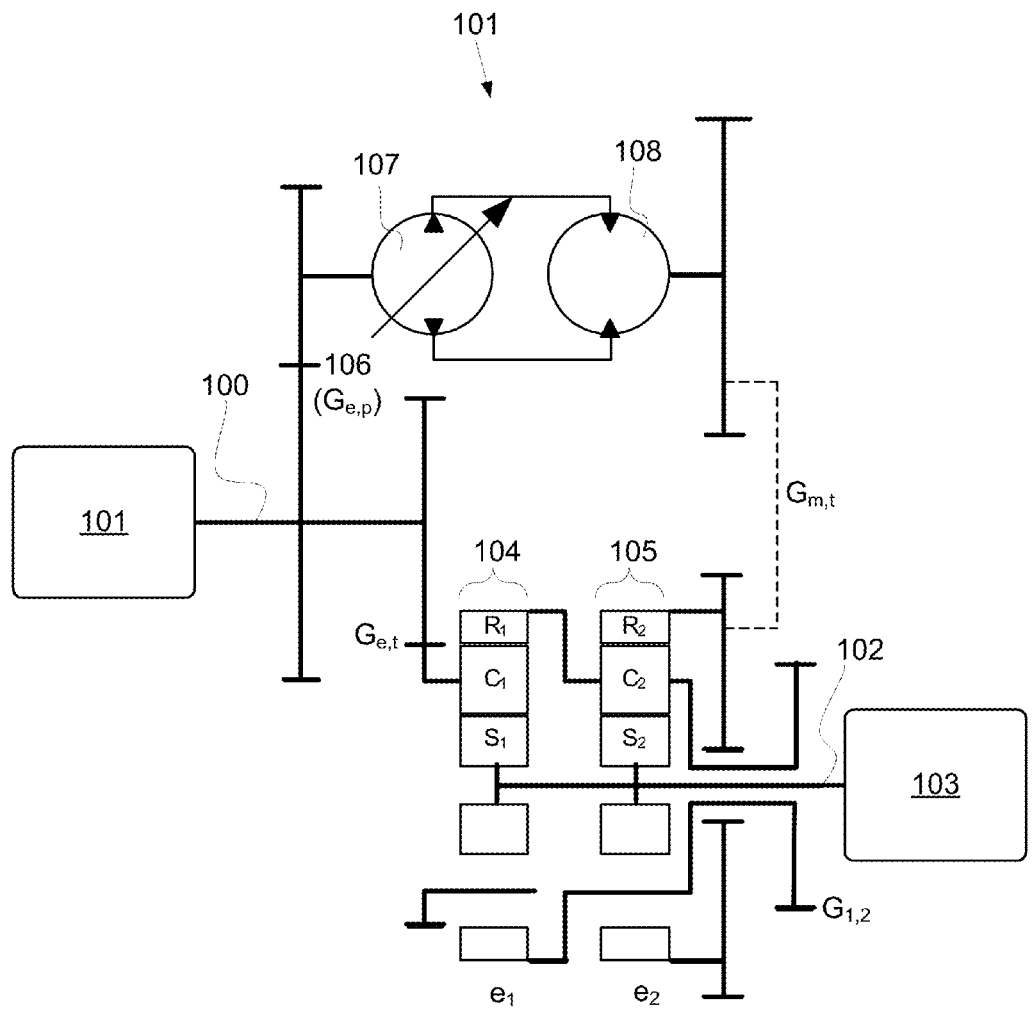
FIG. 1 is a schematic illustration of a split power CVT having a variable displacement hydraulic pump and a fixed displacement hydraulic motor configuration for use in accordance with the described principles.

This disclosure relates to a system that allows the parallel use of multiple variators or hydraulic motors in a single system while ensuring that the motors or variators do not conflict with one another, reducing machine efficiency and power. A split power CVT with a variable displacement hydraulic pump and a fixed displacement hydraulic motor configuration is shown schematically in FIG. 1. In the context of this document, there is no limitation on the exact configuration of the hydraulic pump, and the pump may be, for example, an axial pump, bent axis pump, radial pump, gear pump, vane pump, etc.

The input 100 is mechanically linked to engine 101 and the output 102 is mechanically linked to a downstream transmission gear train 103. In this configuration, there are two parallel paths of power transmission from input to output. A mechanical power transmission path establishes power flow between input 100 and output 102 via first planetary gear set 104, and second planetary gear set 105.

A hydraulic power transmission path splits the power from the input 100 and passes it onto the output 102 (or from the output 102 to the input 100) via gear set $G_{e,p}$ 106 a hydraulic pump 107, a hydraulic motor 108, the gear set $G_{m,t}$ 109, the second planetary gear set 105 and the first planetary gear set 104. Changing the swash plate position for the pump 107 will change the motor speed. In this way, it is possible to regulate the transmission output speed continuously under various system operating conditions and system uncertainties, even while the engine speed remains relatively constant.

Figure 2:
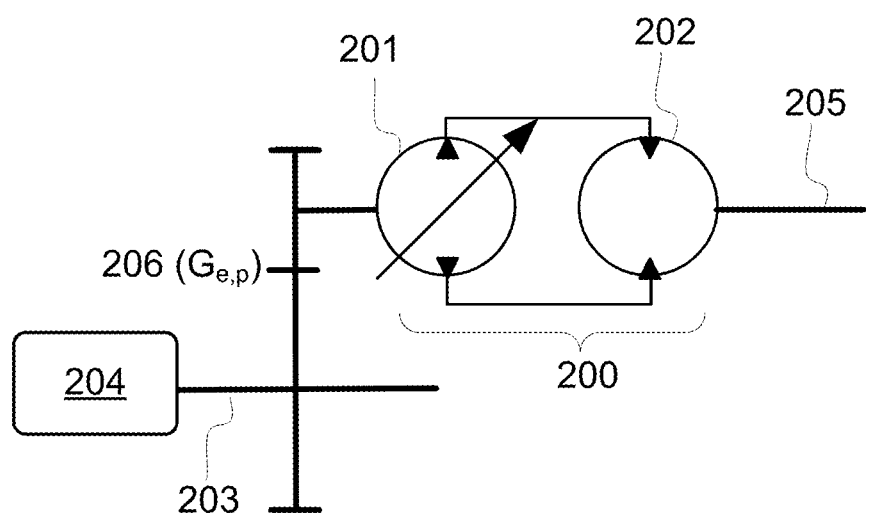
FIG. 2 is a schematic illustration of a hydrostatic transmission having with a variable displacement hydraulic pump and a fixed displacement hydraulic motor for use in accordance with the described principles.

The structure of a hydrostatic transmission is similar in some respects to the CVT transmission as can be seen in FIG. 2. The schematic of FIG. 2 shows a hydrostatic transmission 200 with a variable displacement hydraulic pump 201 and a fixed displacement hydraulic motor 202. The system input 203 is connected to engine 204 via gear set $G_{e,p}$ 206 and the motor shaft becomes the output 205. In the same manner as for a split power CVT, continuously changing the swash plate position of the pump 201 will continuously change the motor 200 speed and thus continuously regulate the transmission output 205 speed/torque to accommodate various system operating conditions and uncertainties.

As noted above, it is difficult to scale the split power CVT and Hydrostatic transmissions up to larger powers (i.e., larger displacements) due to inefficiencies in operation and control that arise with larger variators, as well as the high expense to eliminate these problems in a single variator. Moreover there has not been, to date, an efficient way in which to use multiple smaller variators to perform the same function as a single larger variator. This is due to the way in which variators operate. In particular, if multiple variators are tied together, even the slightest mismatch in characteristics will destroy the efficiency of the transmission by allowing the variators to fight one another. Compounding this problem, it is difficult, if not impossible, to manufacture multiple variators sharing the exact same characteristics.

Figure 3:
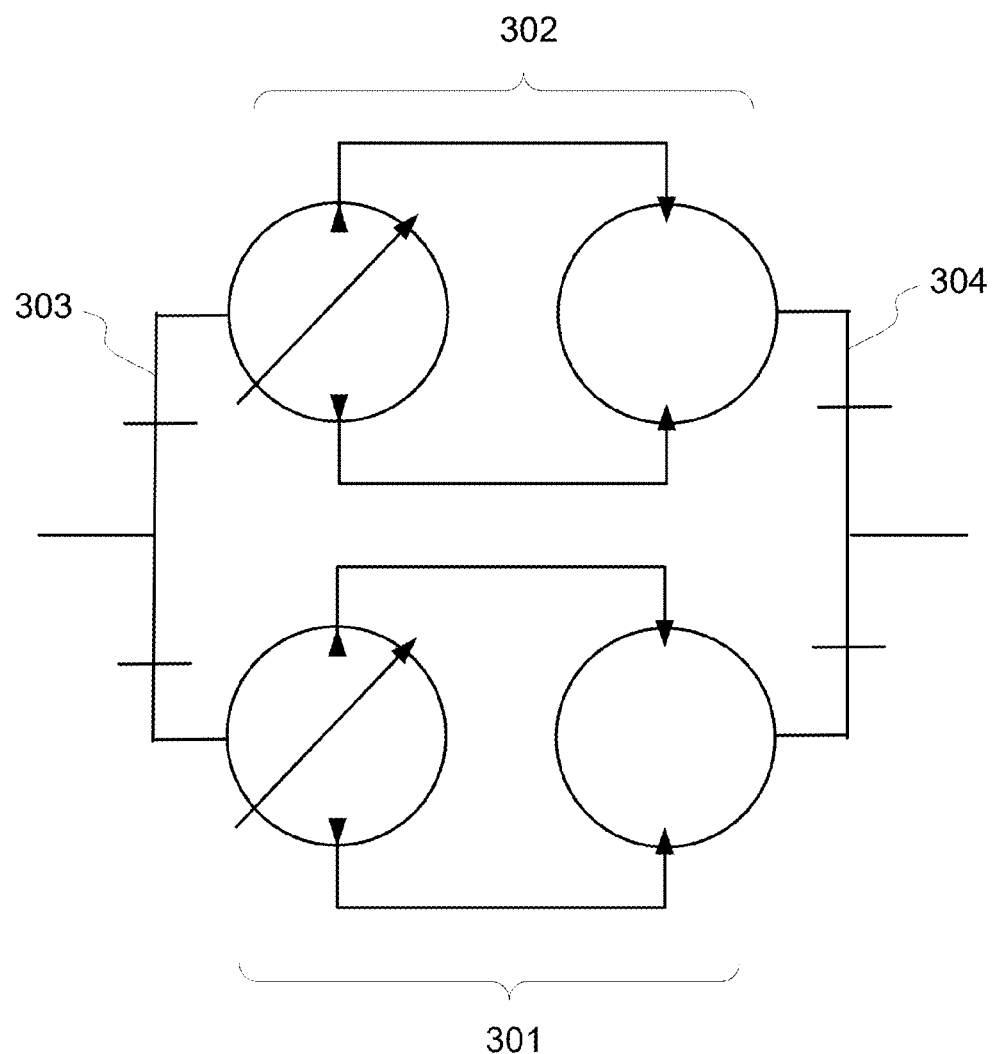
FIG. 3 is a schematic showing a parallel variator system wherein precise variator matching is required to avoid a loss of efficiency due to mode mismatch at low pressure and during transients.

This problem can be seen in FIG. 3, which is a schematic diagram of two variators 301, 302 tied together by gear sets 303, 304. Since both of the variator inputs and variator outputs are strictly tied, both variators must work in exactly the same mode or they will fight, greatly reducing the efficiency of the entire system.

Figure 4:
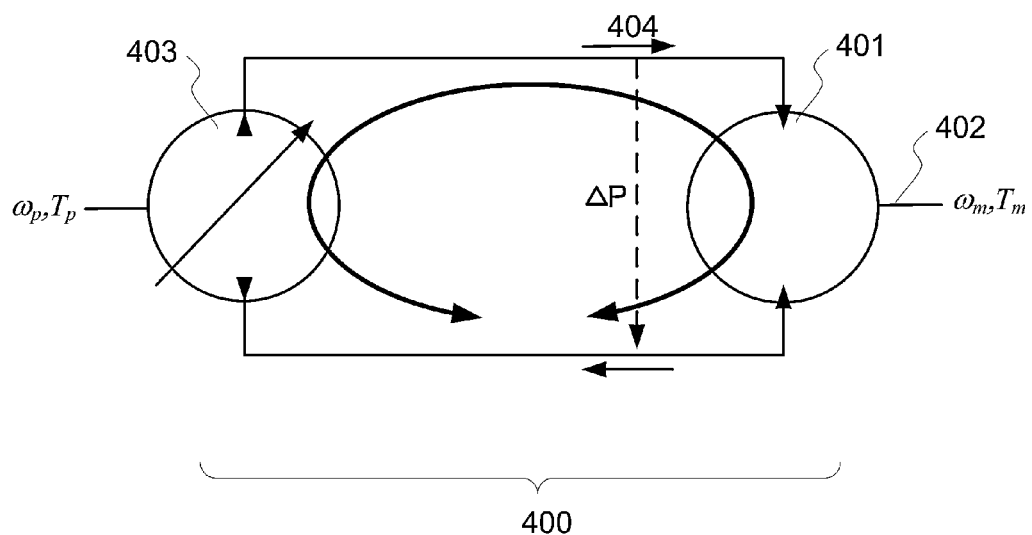
FIG. 4 is a schematic showing a pressure differential and flow patterns within a single variator.

The fundamental requirement to avoid conflict and loss of efficiency when using multiple variators in parallel is that at the steady state, all the variators should perform the same function, or work in the same mode, i.e., applying torque or receiving torque. The working mode is defined by power flow, which can be determined by the sign of the product of motor 401 output 402 torque $T_m$ and motor 401 output 402 speed $\omega_m$, $sgn(T_m\omega_m)$, as shown in the schematic diagram 400 of FIG. 4 and indicated by the following equations:

$$sgn(T_m\omega_m) \geq 0 \quad (1)$$

and $$sgn(T_m\omega_m) < 0 \quad (2)$$

If Eq. (1) is satisfied, then the power flow is positive, and the variator 400 working mode is that the pump 403 works as a pump and the motor 401 works as a motor. If Eq. (2) is satisfied, then the power flow is negative and the variator 400 working mode is that the pump 403 works as a motor and the motor 401 works as a pump. Since $$sgn(T_m\omega_m) = sgn(\Delta P D_m Q) \quad (3)$$

where Dm is the displacement of the motor 401, the variator 400 working mode can also be determined by the sign of the product of pump loop pressure $\Delta P$ and the pump loop flow as expressed by $$sgn(\Delta P D_m Q) \geq 0 \quad (4)$$

and $$sgn(\Delta P D_m Q) < 0 \quad (5)$$

If Eq. (4) is satisfied, the power flow is positive and the variator 400 working mode is that the pump 403 works as a pump and the motor 401 works as a motor. If Eq. (5) is satisfied, the power flow is negative and the variator 400 working mode is that the pump 403 works as a motor and the motor 401 works as a pump.

For a fixed displacement motor, Eqs. (4) and (5) become $$sgn(\Delta P Q) \geq 0 \quad (6)$$

and $$sgn(\Delta P Q) < 0 \quad (7)$$

If the direction of pump loop flow 404 is constrained by its output 402, the power flow will only be determined by the sign of the pump loop pressure $\Delta P$. Therefore, controlling the pump loop pressure $\Delta P$ will control the variator 400 power flow and thus controls the variator 400 working mode.

Figure 5:
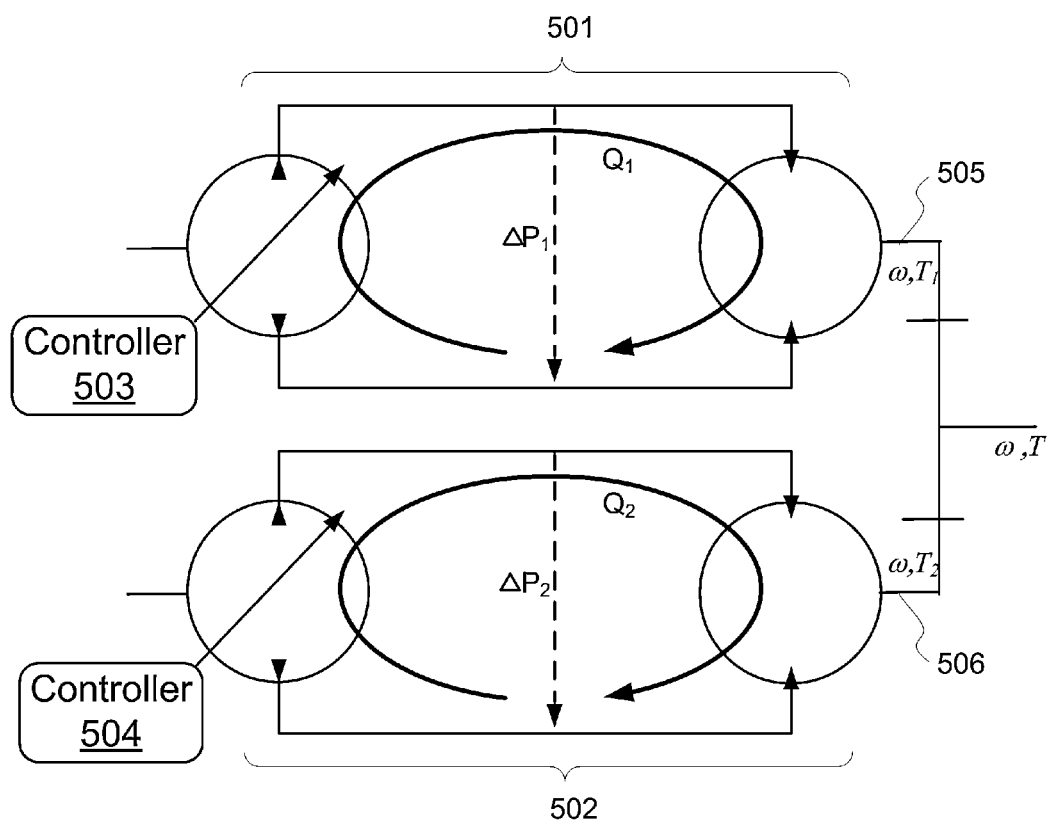
FIG. 5 is a schematic showing a parallel variator system and independent variator control requirements.

As such, it would be beneficial in multiple variator applications to force all variators to work in the same mode when they are integrated together at their output to power the related system. As shown in FIG. 5, the closed loop controlling each pump loop pressure via controllers 503, 504 can be used for regulating the output torque T. Due to the system uncertainties and the manufacturing tolerances, the two (or multiple) variators 501, 502 cannot be identical and normally the controlled loop pressures will not be the same, i.e., $\Delta P_1 \neq \Delta P_2$. To maintain the multiple variators in the same mode, the loop pressures must have the same sign. This is more important at low loop pressure for steady state pressure control accuracy since small changes can result in a mode reversal at low pressures. In addition, during the system transients it is important to maintain accuracy since variators fighting each other at this time could result in system instability, e.g., oscillations.

The closed loop controlling each pump displacement can also be used for regulating the output speed ω. As noted above, due to the system uncertainties and the manufacturing tolerances, the multiple variators 501, 502 cannot be identical and normally the controlled pump displacement will not be the same so that the loop flow for the variators are normally not the same, i.e., $Q_1 \neq Q_2$. Even if the displacements were the same, the volumetric efficiencies for the variators will generally not match, so that the loop flows will not match. In short, the loop flows for the variators 501, 502 do not typically match, even under identical control attempts. Since the variators output shafts 505, 506 are geared with the same gear, based on flow continuity, the loop pressures of the multiple variators must take different sign when the flows do not match. This means the variators will fight each other and may cause instability.

Figure 6:
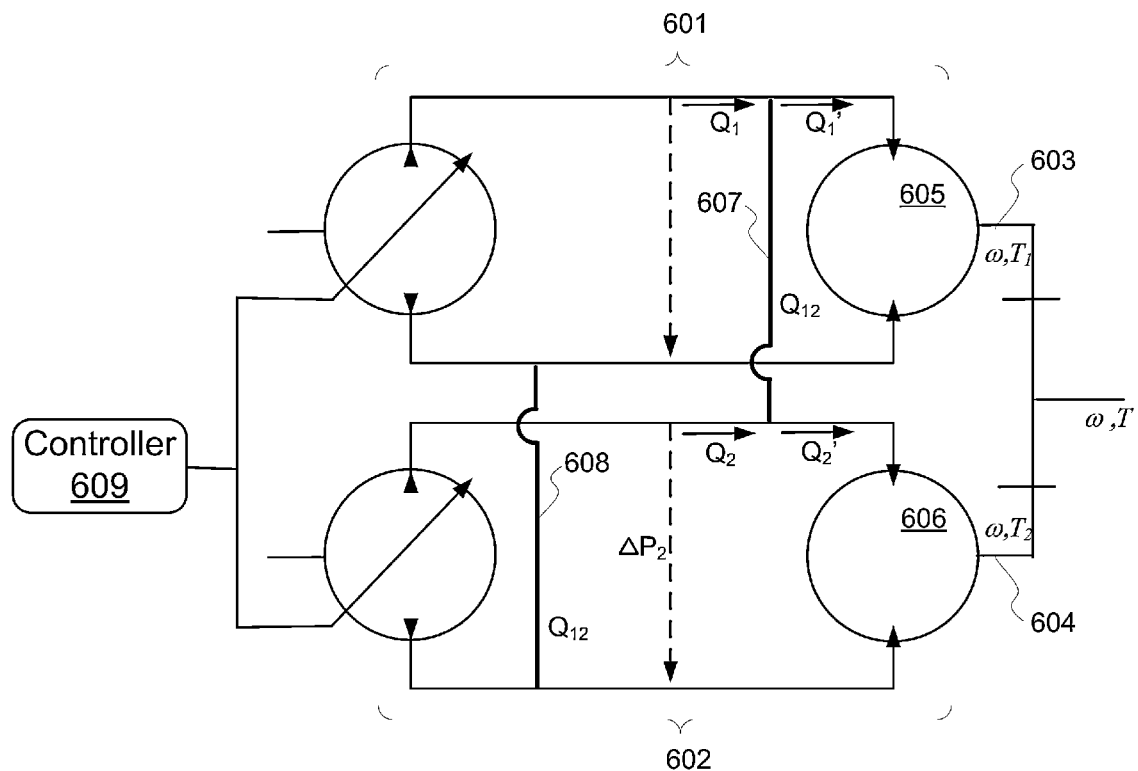
FIG. 6 is a schematic showing a bridged parallel variator system according to the described principles, enabling a forced match and joint variator control.

As shown in FIG. 6, for output torque control (or pump loop pressure control), the pump loops for the variators 601, 602 are connected via a first bridging hydraulic link 607 and a second bridging hydraulic link 608 such that the sign of the product of pump loop pressure and the pump loop flow are forced to match mechanically and hydraulically, regardless of system uncertainties. In this way, all variator working modes will match, both in steady state and during the transients.

The motor speeds for all variators 601, 602 must be the same due to the mechanical constraints (the output shafts 603, 604 of the motors 605, 606 are geared with a common gear) and so for the pump flows as well. The compensation flow $Q_{12}$ automatically makes up the flow differences among the variator loops. In this way, for example, when the pump displacements are commanded very low, e.g., close to zero, by controller 609, local loop variations due to different pump displacement signs on the pump side will not affect the match between the working modes of the variators 601, 602.

To execute output speed control (or pump loop displacement control) when the pump loops for the variators 601, 602 are connected as shown, the sign of the product of pump loop pressure and the pump loop flow are forced to match mechanically and hydraulically. In this way, the variators' working modes will also always match, both during steady state operation and during transients in speed and torque.

In addition to robustness, the illustrated configuration also improves system efficiency. In particular, since the output modes for the variators will match, any optimization for pump displacement will not jeopardize the functioning of the system. The pump displacements can thus be controlled individually for better overall system performance since the compensation flow $Q_{12}$ automatically mitigates flow differences among the variator loops.

Figure 7:
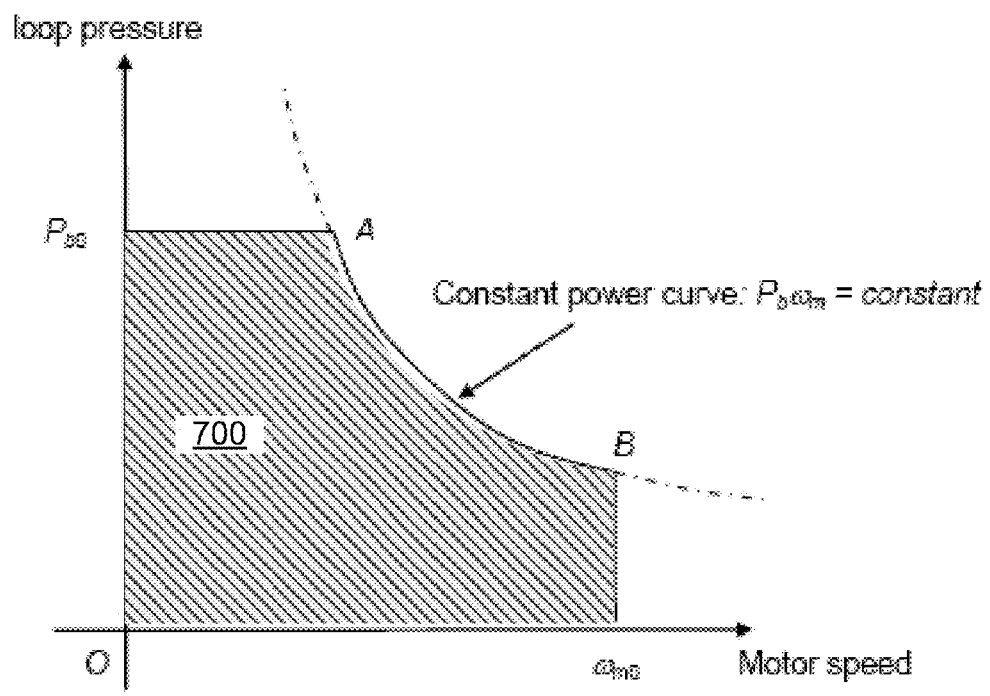
FIG. 7 is a motor speed-pressure plot showing multiple modes of operation within system limitations.

In an embodiment, power limitations are imposed in addition to ordinary controls. As shown in the motor speed-pressure plot of FIG. 7, two operating regimes may occur. In the first operating regime 700, the multiple-variator system is operated within the envelope O-$P_{b0}$-A-B-$\omega_{m0}$-O, in which case the power is said to be within the system limitations. In the second regime, the machine is operated along the curve A-B, representing constant power dissipation. $P_{b0}$ and $\omega_{m0}$ represent the maximum control pressure and the maximum motor speed respectively. Assuming that, for the first regime, the desired output speed is $\omega_d(t)$ and that the power limit on the system is $W_l$, then the desired output speed is determined as $$\omega'_d = \begin{cases} \omega_d(t) & \text{if } \sum P\omega_m < k_w W_l \\ \dfrac{k_w W_l}{P} & \text{if } \sum P\omega_m \geq k_w W_l \end{cases} \quad (8)$$

where $k_w$ is a constant. Thus, the motor speed control and the motor power control are unified in controlling the motor speed to track to the desired time history expressed by Eq. (8). A low-pass filter or boundary layer may be added to prevent the system chattering along the constant power boundary, and the displacement of the pumps can be adjusted accordingly.

For pressure control applications, assume that the desired pump discharge pressure is $P_d(t)$. If the power limit on the motor is $W_l$, then whether the control should be power limited or not will be decided by the following equations.

$$P'_d(t) = \begin{cases} P_d(t) & \text{if } P_d\omega < k_w W_l \\ \dfrac{k_w W_l}{\omega} & \text{otherwise} \end{cases} \quad (9)$$

It will be appreciated from the foregoing discussion that it may be desirable to sense certain system parameters. As such, certain sensors are included in the system in an embodiment. For example, hydraulic pressure sensors, pressure transducers, pump (or motor) displacement sensors, and/or a system output speed sensor are used in an embodiment to enable speed and torque control strategies.

INDUSTRIAL APPLICABILITY

The hydraulic system design for multiple variators described herein allows the use of multiple parallel variators in split power CVT and hydrostatic transmissions without incurring the damaging effects of mismatched variators. The system may be employed in heavy-duty machines such as earth-moving machines, earth-working machines, large materials transportation systems, agricultural machines, and the like, wherein a large variator system is needed to facilitate a split power CVT or hydrostatic transmission. With the provided system design, the individual variators are independently controllable without interference, and the variators need not be matched beforehand. The designed system can be controlled both in pressure (torque) and displacement (speed) modes. Further, using the disclosed design, system power control may be integrated with the control system. Notably, the drawbacks of large hydraulic pumps and motors are overcome, and thus limited scaling due to product line availability is no longer a required design consideration.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A system for providing hydraulic power in a machine transmission comprising:
    a first hydraulic variator having:
        a first input,
        a first hydraulic pump linked to the first input,
        a first hydraulic motor linked to the first hydraulic pump via a first hydraulic circuit having a first side and a second side, and
        a first output from the first hydraulic motor;
    a second hydraulic variator having:
        a second input,
        a second hydraulic pump linked to the second input,
        a second hydraulic motor linked to the second hydraulic pump via a second hydraulic circuit having a first side and a second side, and
        a second output from the second hydraulic motor;
    a first bridging hydraulic link hydraulically connecting the first side of the second hydraulic circuit to the first side of the first hydraulic circuit;
    a second bridging hydraulic link hydraulically connecting the second side of the second hydraulic circuit to the second side of the first hydraulic circuit;
    a common input geared to the first input and the second input, such that the first and second inputs rotate at a same input speed; and
    a common output geared to the first output and the second output, such that the first and second outputs rotate at a same output speed; and
    a controller configured to control the first hydraulic variator and the second hydraulic variator in accordance with a variator output control mode and an always matching working mode of the first and second hydraulic variators.

2. The system for providing hydraulic power in a machine transmission as in claim 1, further comprising an engine linked to the common input.

3. The system for providing hydraulic power in a machine transmission as in claim 2, wherein the machine transmission is a hydrostatic transmission, and wherein the common output is linked to a ground-engaging system for propelling a machine.

4. The system for providing hydraulic power in a machine transmission as in claim 2, wherein the machine transmission is a continuously variable transmission, the system further comprising:
    a mechanical transmission linked to the engine, the mechanical transmission providing an output to a machine propulsion system,
    wherein the common output is linked to the mechanical transmission to continuously vary an output speed of the mechanical transmission.

5. The system for providing hydraulic power in a machine transmission as in claim 1 wherein the controller is configured to control the first and second hydraulic variators in a variator output speed control mode.

6. The system for providing hydraulic power in a machine transmission as in claim 1 wherein the controller is configured to control the first and second hydraulic variators in a variator output torque control mode.

7. The system for providing hydraulic power in a machine transmission as in claim 1 wherein the controller is configured to control the first and second hydraulic variators in a pump discharge pressure control mode.

8. The system for providing hydraulic power in a machine transmission as in claim 1, further comprising:
    a third a hydraulic variator having:
        a third input,
        a third hydraulic pump linked to the third input,
        a third hydraulic motor linked to the third hydraulic pump via a third hydraulic circuit having a first side and a second side, and
        a third output from the hydraulic motor,
    a third bridging hydraulic link hydraulically connecting the first side of the third hydraulic circuit to the first side of the first hydraulic circuit;
    a fourth bridging hydraulic link hydraulically connecting the second side of the third hydraulic circuit to the second side of the first hydraulic circuit; and
    wherein the third input is linked to the common input, and the third output is linked to the common output.

9. A hydraulic machine transmission comprising:
    two or more variators linked in parallel mechanically such that inputs of the two or more variators rotate at a same input rotational speed, and outputs of the two or more variators rotate at a same output rational speed, each of the two or more variators having a hydraulic circuit with first and second sides;
    a first bridging hydraulic link between the first sides of the hydraulic circuits of all of the two or more variators;
    a second bridging hydraulic link between the second sides of the hydraulic circuits of all of the two or more variators;
    a controller configured to control the two or more variators in accordance with a variator output control mode and an always matching working mode of the two or more variators.

10. The hydraulic machine transmission as in claim 9, further comprising an engine linked to the inputs of the two or more variators.

11. The hydraulic machine transmission as in claim 10, wherein the machine transmission is a hydrostatic transmission, further comprising a common output linked to the outputs of the two or more variators, wherein the common output is also linked to a ground-engaging system for propelling a machine.

12. The hydraulic machine transmission as in claim 10, wherein the machine transmission is a continuously variable transmission, the system further comprising:
    a mechanical transmission linked to the engine, the mechanical transmission providing an output to a machine propulsion system;
    a common output linked to the outputs of the two or more variators, wherein the common output is linked to the mechanical transmission to continuously vary an output speed of the mechanical transmission.

13. The hydraulic machine transmission of claim 9 wherein the controller is configured to control the two or more hydraulic variators in a variator output speed control mode.

14. The hydraulic machine transmission of claim 9 wherein the controller is configured to control the two or more hydraulic variators in a variator output torque control mode.

15. The hydraulic machine transmission of claim 9 wherein the controller is configured to control the two or more hydraulic variators in a pump discharge pressure control mode.

16. A method of providing stability in a variator system having multiple variators mechanically connected in parallel, each one of the multiple variators having a hydraulic circuit with first and second sides, the method comprising:

hydraulically connecting the first circuit sides of each one of the multiple variators to a first bridging hydraulic link;

hydraulically connecting the second circuit sides of each one of the multiple variators to a second bridging hydraulic link, the hydraulically connecting the first circuit sides and hydraulically connecting the second circuit sides facilitating providing a substantially same pressure differential between the first circuit side and second circuit side in each variator of the multiple variators; and controlling, by a controller, the multiple variators in accordance with a variator output control mode and an always matching working mode of the multiple variators.

17. The method of providing stability in a variator system having multiple variators according to claim 16, wherein the controlling comprises controlling the multiple variators in a variator output speed control mode.

18. The method of providing stability in a variator system having multiple variators according to claim 16, wherein the controlling comprises controlling the multiple variators in a variator output torque control mode.

19. The method of providing stability in a variator system having multiple variators according to claim 16, wherein the controlling comprises controlling the multiple variators in a pump discharge pressure control mode.

20. The method of providing stability in a variator system having multiple variators according to claim 16, wherein the variator system is configured for incorporation into one of the group consisting of: a hydrostatic transmission and a continuously variable transmission.

* * * * *